US 12,023,768 B2

(12) United States Patent
Lin et al.

(10) Patent No.: US 12,023,768 B2
(45) Date of Patent: Jul. 2, 2024

(54) WASTE COLLECTING DEVICE

(71) Applicant: SHENZHEN GEESUN INTELLIGENT TECHNOLOGY CO., LTD., Guangdong (CN)

(72) Inventors: Rui Lin, Guangdong (CN); Rongjun Chen, Guangdong (CN); Xueke Wu, Guangdong (CN); Rukun Yang, Guangdong (CN)

(73) Assignee: SHENZHEN GEESUN INTELLIGENT TECHNOLOGY CO., LTD., Guangdong (CN)

( * ) Notice: Subject to any disclaimer, the term of this patent is extended or adjusted under 35 U.S.C. 154(b) by 275 days.

(21) Appl. No.: 17/741,551

(22) Filed: May 11, 2022

(65) Prior Publication Data

US 2023/0136955 A1    May 4, 2023

(30) Foreign Application Priority Data

Nov. 2, 2021    (CN) .......................... 202111288150.3

(51) Int. Cl.
| | |
|---|---|
| *B30B 9/30* | (2006.01) |
| *B09B 3/32* | (2022.01) |
| *B23Q 11/00* | (2006.01) |
| *B09B 101/15* | (2022.01) |

(52) U.S. Cl.
CPC ............ *B23Q 11/0046* (2013.01); *B09B 3/32* (2022.01); *B30B 9/301* (2013.01); *B09B 2101/15* (2022.01)

(58) Field of Classification Search
CPC .. B30B 1/32; B30B 9/301; B30B 9/28; B30B 9/3032; B30B 9/32; B30B 11/02; B30B 9/3042; B30B 15/0052; B65B 1/1405; B65B 2210/162; B65B 2210/167; B09B 3/32; B09B 2101/15; B23Q 11/0046; B23K 26/38; B23K 26/70

See application file for complete search history.

(56) References Cited

U.S. PATENT DOCUMENTS

| | | | | |
|---|---|---|---|---|
| 3,635,002 | A * | 1/1972 | Ries ......................... | B65F 5/005 |
| | | | | 55/315 |
| 5,694,742 | A * | 12/1997 | Elliott ....................... | B65B 1/24 |
| | | | | 53/529 |

FOREIGN PATENT DOCUMENTS

CN    111069789 A  *  4/2020

* cited by examiner

*Primary Examiner* — Jimmy T Nguyen
(74) *Attorney, Agent, or Firm* — IP & T GROUP LLP

(57) ABSTRACT

Embodiments of the present application provide a waste collecting device, which relates to the technical field of lithium cell manufacturing. The waste collecting device includes a frame, a waste buffer box, a negative pressure flow-equalizing box and a waste collecting box. The waste buffer box is arranged in an upper part of the frame and the waste buffer box is provided with a waste pipeline. The negative pressure flow-equalizing box is arranged on the top of the waste buffer box, the negative pressure flow-equalizing box is communicated with the waste buffer box, and the negative pressure flow-equalizing box is provided with a negative pressure pipeline. The waste collecting box is movably arranged in the lower part of the frame and is selectively communicated with the waste buffer box.

10 Claims, 6 Drawing Sheets

WASTE COLLECTING DEVICE

CROSS-REFERENCE TO RELATED APPLICATION

The present disclosure claims the priority to the Chinese patent application filed with the Chinese Patent Office on Nov. 2, 2021 with the filing No. 202111288150.3, and entitled "Waste Collecting Device", all the contents of which are incorporated herein by reference in entirety.

TECHNICAL FIELD

The present application relates to the technical field of lithium cell manufacturing, in particular to a waste (waste material) collecting device.

BACKGROUND ART

During the shaping process of electrode tabs of electrode of a lithium ion cell which are cut using laser, a considerable amount of waste of electrodes will be produced. If the waste cannot be cleaned up in time, it will be caused that the cutting effect of the electrode tabs is poor. At present, the waste may be collected mainly in three ways. The first way is called as the waste free-falling method, that is, a waste collecting box is disposed under the laser cutting station, and the waste generated after cutting using the laser the electrode tabs will fall freely into the waste box, and then the waste is to be manually removed. The second way is to use a crushing machine to suck away the waste and cut the waste into debris, and collect them in a debris bag. The third way is to use a waste machine to suck the waste into the waste box and compress it, and then collect it using the waste collecting box.

According to the investigation by the inventor, since the first and second ways both have the low security, the third one is widely used at present. However, with the third way, it is easy to generate the problem that the local negative pressure is too large such that the waste is absorbed, thereby causing the material to be blocked and affecting the collection of the waste.

SUMMARY

The objects of the present application comprise, for example, providing a waste collecting device, which can realize the uniform flow of gas in the chamber, avoid the problem that the waste blocks the opening of the negative pressure pipeline due to excessive local negative pressure, and ensure the smooth collection of the waste.

Embodiments of the present application can be implemented as follows.

In a first aspect, the present application provides a waste collecting device, comprising a frame, a waste buffer box, a negative pressure flow-equalizing box and a waste collecting box, wherein the waste buffer box is arranged on an upper part of the frame, the waste buffer box is provided thereon with a waste pipeline, the waste pipeline is configured to extend to an operation station to make generated waste transported to the waste buffer box, the negative pressure flow-equalizing box is arranged on a top of the waste buffer box, the negative pressure flow-equalizing box is communicated with the waste buffer box, the negative pressure flow-equalizing box is configured to equalize gas flowing in from the waste buffer box, and a negative pressure pipeline is arranged on the negative pressure flow-equalizing box, the negative pressure pipeline is configured to draw out gas in the negative pressure flow-equalizing box, and the waste collecting box is movably arranged at a lower part of the frame and is selectively communicated with the waste buffer box for collecting waste dropped from the waste buffer box.

In an optional embodiment, a first flow-equalizing plate is further provided between the negative pressure flow-equalizing box and the waste buffer box, the first flow-equalizing plate is provided with a plurality of first flow-equalizing holes, and the negative pressure flow-equalizing box communicates with the waste buffer box through the plurality of first flow-equalizing holes.

In an optional embodiment, the waste collecting device further comprises a waste compressing box disposed between the waste buffer box and the waste collecting box, the waste compressing box is selectively communicated with the waste buffer box, the waste compressing box is selectively communicated with the waste collecting box, and the waste compressing box is configured to temporarily store the waste dropped from the waste buffer box and compress the waste.

In an optional embodiment, a buffer opening is provided at a bottom of the waste buffer box, the buffer opening communicates with the waste compressing box, a waste buffer division plate is movably provided at the buffer opening, and the waste buffer division plate is configured to block or open the buffer opening.

In an optional embodiment, a compressing opening is provided at a bottom of the waste compressing box, the compressing opening communicates with the waste collecting box, a waste compression division plate is movably provided at the compressing opening, and the waste compression division plate is configured to block or open the compressing opening.

In an optional embodiment, a compression cylinder is arranged on a top of the waste compressing box, a pressure head is movably arranged in the waste compressing box, and the pressure head is in transmission connection with the compression cylinder so as to compress waste in the waste compressing box under driving of the compression cylinder.

In an optional embodiment, a negative pressure branch pipeline is further provided on the negative pressure pipeline, and the negative pressure branch pipeline communicates with the waste compressing box.

In an optional embodiment, a compression flow-equalizing box is further arranged on the waste compressing box, a second flow-equalizing plate is arranged between the compression flow-equalizing box and the waste compressing box, a plurality of second flow-equalizing holes are provided on the second flow-equalizing plate, and the compression flow-equalizing box communicates with the waste compressing box through the plurality of second flow-equalizing holes.

In an optional embodiment, a bottom of the waste collecting box is further provided with a carrying driving vehicle, and the carrying driving vehicle is configured to drive the waste collecting box to disengage from the frame.

In an optional embodiment, a housing is further provided on the frame, the housing wraps the waste buffer box, the negative pressure flow-equalizing box and the waste compressing box, and the housing is provided with a discharging opening allowing for the waste collecting box and the carrying driving vehicle to enter and exit.

The beneficial effects of the embodiments of the present application, for example, comprise the following.

In the waste collecting device provided by the embodiments of the present application, a negative pressure flow-equalizing box is arranged on the top of the waste buffer box, the negative pressure flow-equalizing box is configured to equalize the gas flowing in from the waste buffer box and at the same time the negative pressure pipeline is connected with the negative pressure flow-equalizing box, and the negative pressure is generated in the waste buffer box through the negative pressure flow-equalizing box, so that the waste is transported to the waste buffer box through the waste pipeline. Compared with the prior art, in the present application, by means of adding a negative pressure flow-equalizing box, it can realize the flow equalizing effect on the inflowing gas of the waste buffer box, and avoid that the local negative pressure in the negative pressure flow-equalizing box is too large and the waste is adsorbed to the air inlet, which therefore avoids from causing the problem that the air inlet of the negative pressure pipeline is blocked by the waste, and the smooth collection of the waste is ensured.

BRIEF DESCRIPTION OF DRAWINGS

In order to illustrate the technical solutions of the embodiments of the present application more clearly, the drawings used in the embodiments are briefly introduced as follows. It should be understood that the following drawings only show some embodiments of the present application, and therefore should not be regarded as a limitation on the protection scope. For those ordinarily skilled in the art, other related drawings can also be obtained according to these drawings without any creative efforts.

Figure 1:
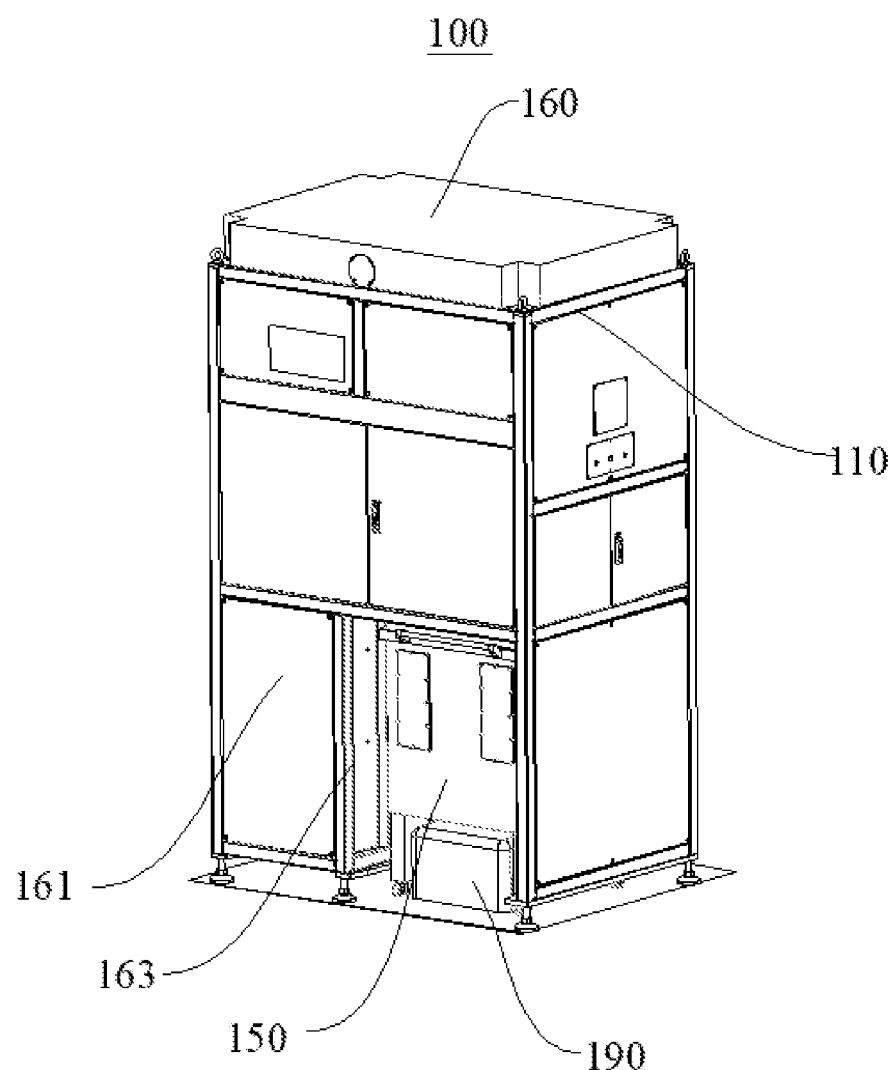
FIG. 1 is a schematic diagram of the external structure of the waste collecting device provided by the present application from a first perspective.
Figure 2:
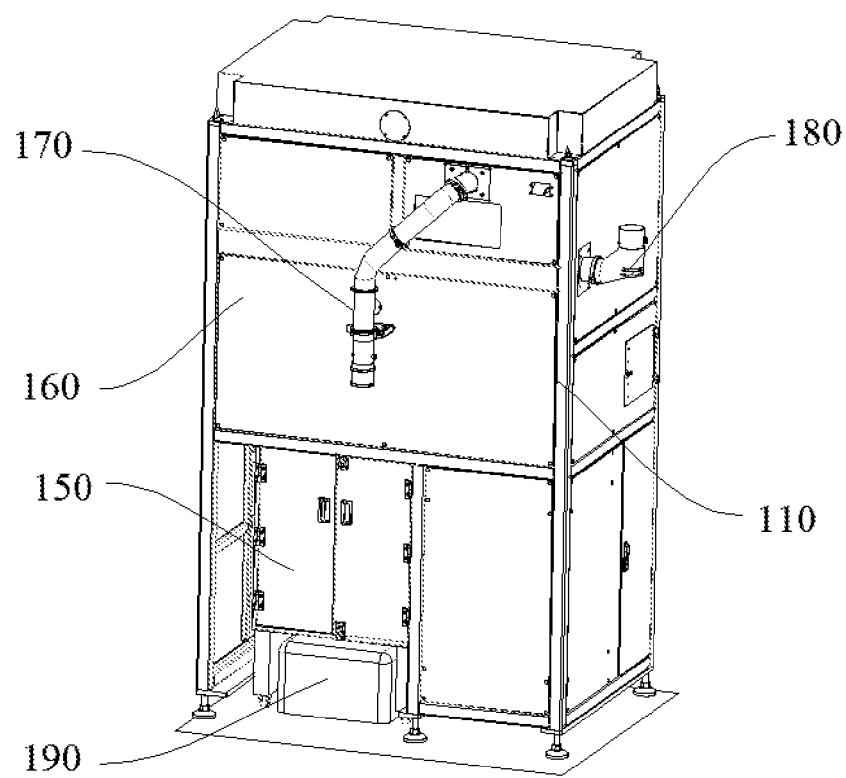
FIG. 2 is a schematic diagram of the external structure of the waste collecting device provided by the present application from a second perspective.

Reference Number: 100—waste collecting device; 110—frame; 120—waste buffer box; 121—waste buffer division plate; 130—negative pressure flow-equalizing box; 131—first flow-equalizing plate; 133—first flow-equalizing hole; 140—waste compressing box; 141—waste compression division plate; 143—compression cylinder; 145—compression flow-equalizing box; 150—waste collecting box; 160—housing; 161—electric control box; 163—discharging opening; 170—waste pipeline; 180—negative pressure pipeline; 181—negative pressure branch pipeline; and 190—carrying driving vehicle.

DETAILED DESCRIPTION OF EMBODIMENTS

In order to make the purposes, technical solutions and advantages of the embodiments of the present application clearer, the technical solutions in the embodiments of the present application will be clearly and completely described below with reference to the drawings in the embodiments of the present application. Obviously, the described embodiments are some but not all of embodiments of the present application. Generally, the components in the embodiments of the present application described and illustrated in the drawings herein may be arranged and designed in a variety of different configurations.

Thus, the following detailed description of the embodiments of the present application provided in the drawings is not intended to limit the scope of the present application as claimed, but is merely representative of selected embodiments of the present application. Based on the embodiments of the present application, all other embodiments obtained by those ordinarily skilled in the art without creative efforts shall fall within the protection scope of the present application.

It should be noted that similar reference numbers and letters refer to similar items in the following figures, and therefore once an item is defined in one figure, it is not required to further define and explain it in subsequent figures.

In the description of the present application, it should be noted that, if the terms, "upper", "lower", "inner", "outer", etc. are presented, the orientation or positional relationship indicated is based on the orientation or positional relationship shown in the drawings, or is the orientation or positional relationship in which the product of the present application is usually placed in use, which is only for the convenience of describing the present application and simplifying the description, rather than indicating or implying that the device or element referred to must be in the specific orientation, or be constructed and operated in the specific orientation, and thus it should not be construed as a limitation on the present application.

In addition, if the terms, "first", "second" and the like, are presented, they are only used to describing the distinguishing, and should not be construed as indicating or implying the importance of the relativity.

As disclosed in the background art, there are mainly three ways of collecting wastes at present, and all of the existing ways of collecting wastes have certain problems.

1. The first way is the waste free-falling method, in which a waste collecting box is provided under the laser cutting station of the electrode tab shaping machine; after the laser is used to cut the electrode tab, the waste falls freely into the waste collecting box under the action of its own weight, wherein due to the space under the laser cutting station being relatively limited, the amount of waste that can be accommodated is relatively small, which requires that it is to be cleaned frequently. If the operator does not pay attention, the laser will still work after the waste box is full, which may easily cause the problems in terms of cutting quality and safety. The temperature at which the electrode tab is cut using the laser is very high, and the waste falling below is also prone to problems, such as fire.

2. The second way is to use a crushing machine to suck away the waste and cut the waste into debris and collect them in a debris bag. This device is of a complex structure, the blade is easy to wear and thus has a low service life, and it is difficult to be maintained. The debris after cutting is relatively fluffy, occupying a large volume. Because the coating material on the surface of the electrodes is flammable and explosive, sparks are easily generated during the crushing process, which may lead to the risk of explosion.

3. The third way is to use a waste machine to suck the waste into the waste box and compress it to form lumps, and then collect them using the waste collecting box. In such structure, since the compression cylinder performs the compression frequently and the waste valve moves frequently, the negative pressure within the waste pipeline is made to be unstable, and it is easy to have the phenomenon that the electrode tab is cut by the laser unstably. At the same time, the negative pressure in the waste buffer box is also extremely uneven, and it is easy to cause the problem that the local negative pressure is too large so as to absorb the waste and block by the waste.

The inventor found from study that, for the sake of safety, the third way is usually used to realize the collection of waste of electrodes in the current conventional technology. In order to solve the shortcomings in the prior art, the present application provides a new type of waste collecting device, which can better ensure that the negative pressure in the waste machine is relatively balanced and uniform, and at the same time, it is of simple structure and low cost, and is stable and reliable, and the operation is convenient and the maintenance is easy to be made. It should be noted that the features in the embodiments of the present application may be combined with each other without conflict.

Embodiments

Referring to FIG. 1 to FIG. 4 in combination, the present embodiment provides a waste collecting device 100, which can realize the uniform flow of gas in the chamber, avoid the problem that the waste blocks the opening of the negative pressure pipeline, which is caused by the excessive local negative pressure, and ensure that the waste can be collected smoothly, and at the same time, it can realize the unmanned management, the simple structure, the low cost, the safety and reliability, the convenient operation and the easy maintenance.

This embodiment provides a waste collecting device 100, which comprises a frame 110, a waste buffer box 120, a negative pressure flow-equalizing box 130, a waste compressing box 140, and a waste collecting box 150. The waste buffer box 120 is arranged on the upper part of the frame 110, and the waste buffer box 120 is provided with a waste pipeline 170. The waste pipeline 170 is used to extend to the operation station and transport the generated waste to the waste buffer box 120. The negative pressure flow-equalizing box 130 is arranged on the top of the waste buffer box 120, and the negative pressure flow-equalizing box 130 is communicated with the waste buffer box 120, and the negative pressure flow-equalizing box 130 is used to equalize the gas flowing in from the waste buffer box 120. The negative pressure flow-equalizing box 130 is provided with a negative pressure pipeline 180, and the negative pressure pipeline 180 is used to draw out (extract) the gas in the negative pressure flow-equalizing box 130. The waste collecting box 150 is movably arranged at the lower part of the frame 110, and is selectively communicated with the waste buffer box 120 for collecting the waste falling from the waste buffer box 120. The waste compressing box 140 is disposed between the waste buffer box 120 and the waste collecting box 150, and the waste compressing box 140 selectively communicates with the waste buffer box 120. The waste compressing box 140 selectively communicates with the waste collecting box 150, and the waste compressing box 140 is used to temporarily store the waste falling (dropped) from the waste buffer box 120 and compress the waste.

In this embodiment, the waste collecting device 100 is suitable for the electrode cutting equipment, wherein the waste pipeline 170 can be directly connected to the electrode cutting station, and the waste generated by cutting can be directly adsorbed and transported to the waste buffer box 120 for being temporarily stored. Here, the specific adsorption principle of the waste pipeline 170 and the structure of extending to the cutting station may be obtained by referring to the existing waste adsorption structure. At the same time, the negative pressure pipeline 180 is directly connected to an external negative pressure source, and for example, the negative pressure pipeline 180 is connected to a vacuum pump, by which the negative pressure is realized.

It is worth noting that, in this embodiment, the negative pressure flow-equalizing box 130 is arranged on the top of the waste buffer box 120, the waste buffer box 120 is located at the upper part of the waste compressing box 140, the waste compressing box 140 is located at the upper part of the waste collecting box 150, the waste buffer box 120 is connected with a waste pipeline 170, the waste pipeline 170 extends to the electrode cutting station, and at the same time, the negative pressure pipeline 180 is connected with the negative pressure flow-equalizing box 130, which is used to provide, through the negative pressure flow-equalizing box 130, the negative pressure to the waste buffer chamber, waste compressing box 140 and the waste collecting box 150. Under the suction effect of the negative pressure, the waste of the electrode successively enters the waste buffer box 120, the waste compressing box 140 and the waste collecting box 150 via the waste pipeline 170, so as to achieve the purpose of collecting the waste. Here, due to the existence of the waste buffer chamber, the waste collecting device 100, as a whole, can work without stopping, achieving the effect of continuously collecting the waste. Moreover, here, by additionally providing a negative pressure flow-equalizing box 130, it is possible to realize the flow-equalizing effect on the inflowing gas of the waste buffer box 120, so as to avoid the local negative pressure in the negative pressure flow-equalizing box 130 from being too large to cause the waste to be adsorbed to the air inlet. Therefore, the problem of causing waste to block the air inlet of the negative pressure pipeline 180 is avoided, and the smooth collection of waste is ensured.

In this embodiment, the bottom of the waste collecting box 150 is further provided with a carrying driving vehicle 190, and the carrying driving vehicle 190 is used to drive the waste collecting box 150 to disengage from the frame 110. Specifically, the carrying driving vehicle 190 can be an AGV trolley. After the waste collecting box 150 is fully loaded, the waste collecting box 150 can be transported to the collection place or the dumping place by the carrying driving vehicle 190, and another carrying driving vehicle 190 can be used to transport the empty waste collecting box 150 to the lower part of the waste compressing box 140 for the next round of waste collection work.

In this embodiment, the frame 110 is further provided with a housing 160, the housing 160 wraps the waste buffer box 120, the negative pressure flow-equalizing box 130 and the waste compressing box 140. The housing 160 is provided with the discharging opening 163 allowing the waste collecting box 150 and the carrying driving vehicle 190 to enter and exit. Specifically, the housing 160 is further provided with an electric control box 161 for accommodating the electric control components, and an opening-and-closing maintenance door is provided on the housing 160 to facilitate the maintenance on each of the internal boxes. At the same time, the bottom of the frame 110 is also provided with several supporting feet for fulfilling the supporting effect.

Figure 5:
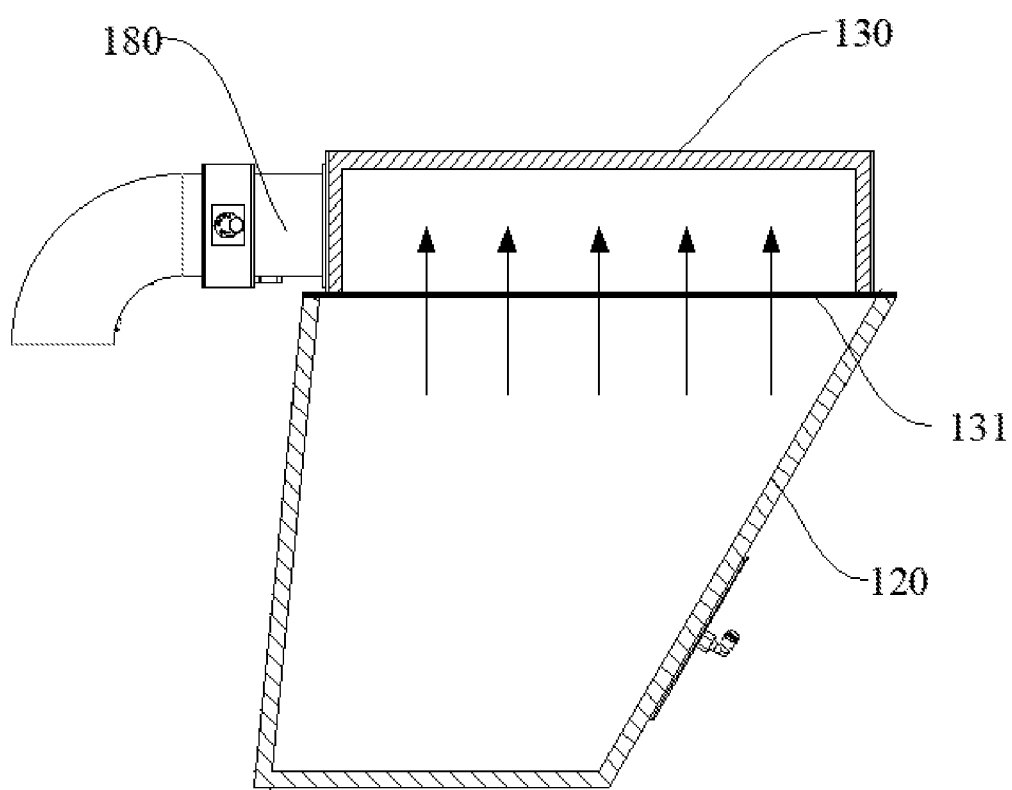
FIG. 5 is a schematic diagram of the connection structure of the waste buffer box and the negative pressure flow-equalizing box in FIG. 3.
Figure 6:
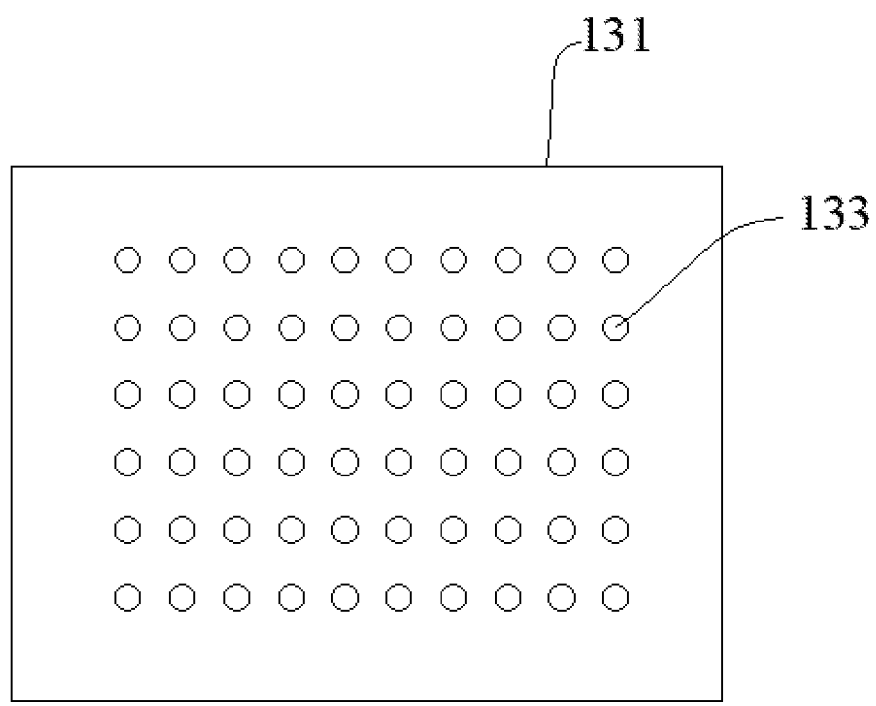
FIG. 6 is a schematic structural diagram of the first flow-equalizing plate in FIG. 5.

Referring to FIG. 5 and FIG. 6 in combination, in an optional embodiment, a first flow-equalizing plate 131 is further provided between the negative pressure flow-equalizing box 130 and the waste buffer box 120, and the first flow-equalizing plate 131 is provided with plural first flow-equalizing holes 133. The negative pressure flow-equalizing box 130 communicates with the waste buffer box 120 through the plurality of first flow-equalizing holes 133. Specifically, the plurality of first flow-equalizing holes 133 are evenly distributed on the first flow-equalizing plate 131. With the suction action of the negative pressure pipeline 180, the gas in the waste buffer box 120 can uniformly flow into the negative pressure flow-equalizing box 130 through the plurality of first flow-equalizing holes 133, and the first flow-equalizing plate 131 and the negative pressure pipeline 180 are arranged at interval, which can further avoid the local negative pressure from being too high, and also avoid the phenomenon that the waste directly blocks the negative pressure pipeline 180 to cause the material blockage.

It should be noted that, in order to further realize the flow equalization, the end of the negative pressure pipeline 180 in this embodiment can also be extended into the negative pressure flow-equalizing box 130, and the part which is extended therein is the pipeline filled with small holes, which is able of further achieving the equalized flow.

Figure 3:
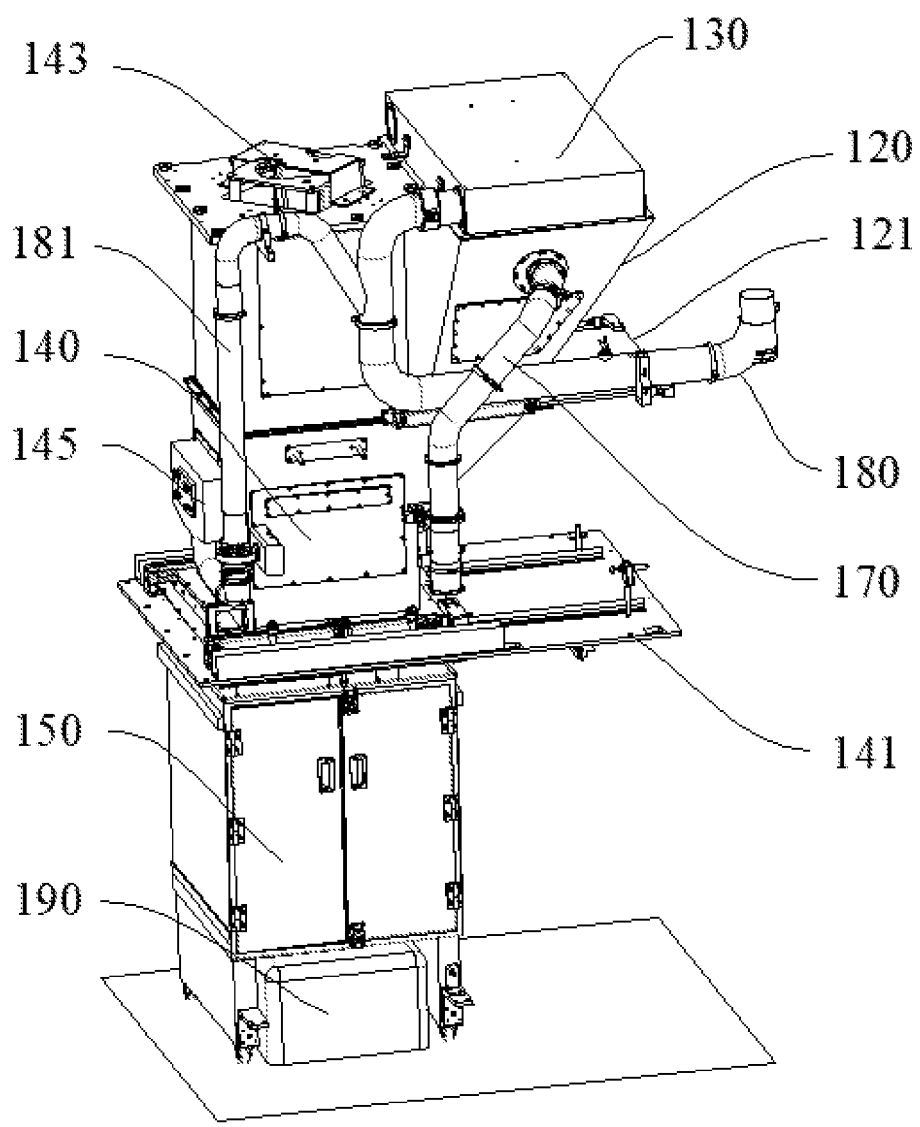
FIG. 3 is a schematic diagram of the internal structure of the waste collecting device provided by the present application from a first perspective.
Figure 4:
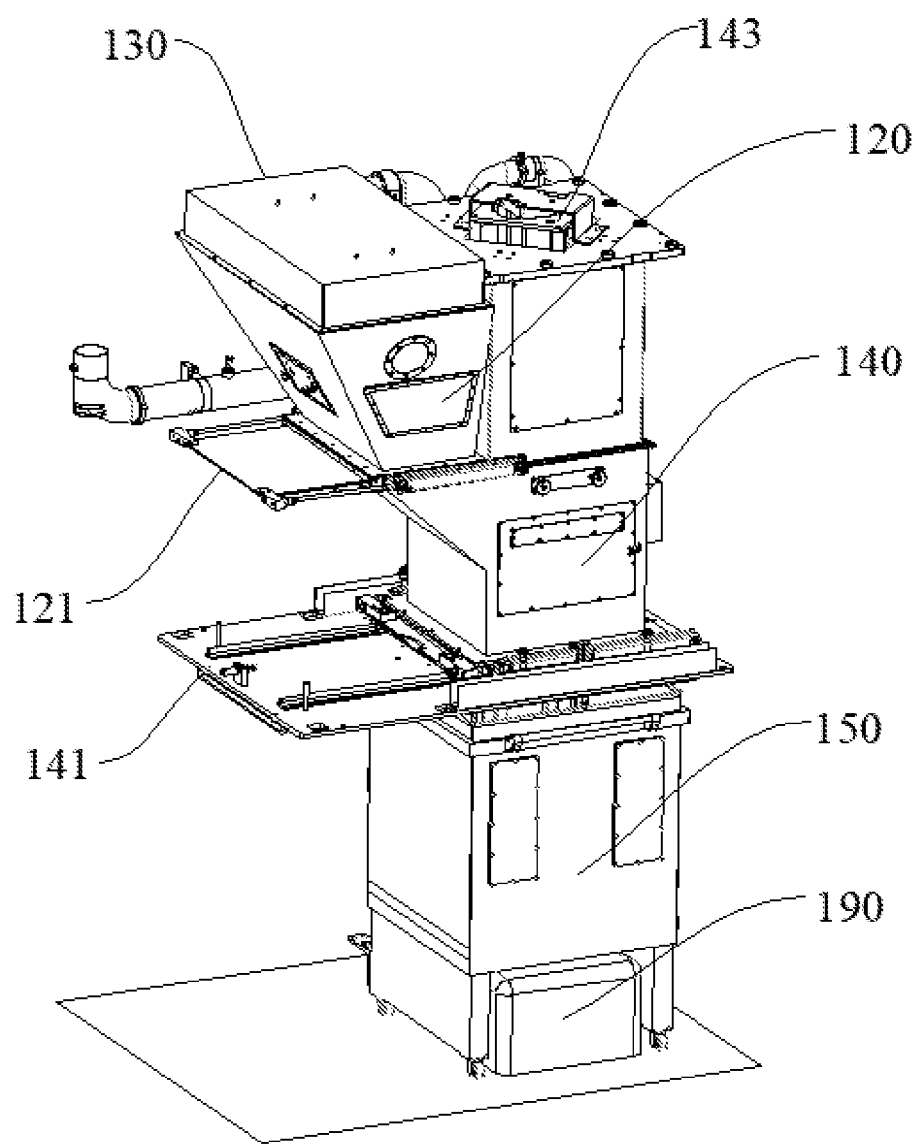
FIG. 4 is a schematic diagram of the internal structure of the waste collecting device provided by the present application from a second perspective.

Continuing to refer to FIG. 3 and FIG. 4, in this embodiment, a buffer opening is provided at the bottom of the waste buffer box 120, the buffer opening communicates with the waste compressing box 140, and a waste buffer division plate 121 is movably arranged at the buffer opening. The waste buffer division plate 121 is used to block or open the buffer opening. Specifically, the bottom of the waste buffer box 120 is also provided with a waste buffer driving member, and the waste buffer driving member can drive the waste buffer division plate 121 to reciprocate in a straight line in the horizontal direction, thereby opening or blocking the buffer opening, and realizing the communication or disconnection between the waste buffer box 120 and the waste compressing box 140.

In this embodiment, a compressing opening is provided at the bottom of the waste compressing box 140, the compressing opening communicates with the waste collecting box 150, a waste compression division plate 141 is movably provided at the compressing opening, and the waste compression division plate 141 is used for blocking or opening the compressing opening. Specifically, the bottom of the waste compressing box 140 is also provided with a discharge driving member, which can drive the waste compression division plate 141 to reciprocate linearly in a horizontal direction, thereby opening or blocking the compressing opening, and realizing the blocking and discharging of the material.

It should be noted that, in this embodiment, the waste buffer driving member and the discharge driving member are both air cylinders, which achieves the driving through the air cylinders and has the good stability.

In this embodiment, a compression cylinder 143 is arranged on the top of the waste compressing box 140, and a pressure head is also movably arranged in the waste compressing box 140. The pressure head is in the transmission connection with the compression cylinder 143, which is used for compressing the waste in the waste compressing box 140 under the driving of the compression cylinder 143. Specifically, the compression cylinder 143 is installed in the vertical direction, so that the pressure head can move up and down in the vertical direction, so as to realize the compression on the waste. It is worth noting that when compressing the waste, it is necessary to ensure that the waste compression division plate 141 is blocked on the compressing opening, where the waste compression division plate 141 can realize the bottom support for the waste to facilitate the compression.

In this embodiment, the negative pressure pipeline 180 is further provided with a negative pressure branch pipeline 181, and the negative pressure branch pipeline 181 communicates with the waste compressing box 140. Specifically, the main pipeline part of the negative pressure pipeline 180 is directly connected to the negative pressure flow-equalizing box 130, and the negative pressure branch pipeline 181 is connected to the main pipeline part through a tee joint, and communicated with the waste compressing box 140, so that the waste compressing box 140 and the waste buffer box 120 are able to be always kept in communication, thereby ensuring that the air pressures of the two are basically the same, which is beneficial to reduce the local flow velocity of the negative pressure at the top of the waste buffer box 120, so that the waste in the waste buffer box 120 is easier to fall into the waste compressing chamber, which can also avoid the phenomenon that when the compression cylinder 143 frequently reciprocates to compress the waste, the dust overflows and the positive pressure flows backward to the waste pipeline 170 to cause the negative pressure to be relatively unstable, which affects stability of the cutting.

In this embodiment, the waste compressing box 140 is further provided with a compression flow-equalizing box 145, and a second flow-equalizing plate (not shown in the figure) is arranged between the compression flow-equalizing box 145 and the waste compressing box 140. The second flow-equalizing plate is provided with a plurality of second flow-equalizing holes, and the compression flow-equalizing box 145 is communicated with the waste compressing box 140 through the plurality of second flow-equalizing holes. Specifically, the structure of the second flow-equalizing plate is similar to that of the first flow-equalizing plate 131, which is not illustrated again here. The plurality of second flow-equalizing holes are evenly distributed on the second flow-equalizing plate. Under the suction effect of the negative pressure branch pipeline 181, the gas in the waste compressing box 140 can uniformly flow into the compression flow-equalizing box 145 through the plurality of second flow-equalizing holes. The second flow-equalizing plate and the negative pressure branch pipeline 181 are arranged at interval, which can further prevent the local negative pressure from being too high, and also avoid the phenomenon that the waste directly blocks the negative pressure branch pipeline 181 to cause the material blockage.

The waste collecting device 100 provided in this embodiment has the working principle as follows. The negative pressure source is connected to the negative pressure pipeline 180, is connected to the negative pressure flow-equalizing box 130 by the main part of the negative pressure pipeline 180, and provides the negative pressure flow-equalizing box 130 with the negative pressure. At the same time, the negative pressure branch pipeline 181 is connected to the waste compressing box 140 and provides the negative pressure to the waste compressing box 140. The negative pressure flow-equalizing box 130 is communicated with the waste buffer box 120, and the waste pipeline 170 is connected to the waste buffer box 120. During normal operation, firstly, the waste buffer division plate 121 is in an open state, and the waste compression division plate 141 is in a blocked state. The waste buffer box 120 and the waste compressing box 140 provide the negative pressure suction for the waste pipeline 170 at the same time, and the waste generated by the cutting at the cutting station, under the action of suction, will enter the waste buffer box 120 along the waste pipeline 170, and then fall into the waste compressing box 140 under the action of gravity. After reaching a certain amount, the waste buffer division plate 121 blocks the buffer opening. The waste buffer box 120 and the waste compressing box 140 are separated from each other, and the compression cylinder 143 drives the pressure head to compress the waste. Then, the waste buffer division plate 121 is opened to wait for the next compression. When the amount of waste in the waste compressing box 140 reaches a certain amount, the negative pressure branch pipeline 181 is closed, and the waste buffer division plate 121 blocks the buffer opening. At this time, the waste compression division plate 141 is opened, and the compressed waste is unloaded to the waste collecting box 150 by using an internal discharging mechanism. After the waste collecting box 150 is fully loaded, the carrying driving vehicle 190 will drive the waste collecting box 150 to transfer as a whole, to complete the action of automatically collecting and transferring waste.

In the waste collecting device 100 provided in this embodiment, the negative pressure flow-equalizing box 130 is arranged on the top of the waste buffer box 120 and the plurality of first flow-equalizing holes 133 are provided on the first flow-equalizing plate 131, so as to realize the communication between the negative pressure flow-equalizing box 130 and the waste buffer box 120, which is beneficial to reduce, as a whole, the flow rate of the local gas from the waste buffer box 120 into the negative pressure flow-equalizing box 130, so that the waste will not be sucked and block the hole end of the negative pressure pipeline 180. In addition, the negative pressure branch pipeline 181 is used to make the waste buffer box 120 communicate with the waste compressing box 140, which is beneficial to reduce the local flow rate of negative pressure at the top of the waste buffer box 120, so that the waste of the waste buffer box 120 is easier to fall to the waste compressing box 140, which can also avoid the phenomenon that when the compression cylinder 143 reciprocates and compresses the waste frequently, the dust overflows and the positive pressure flows backward to the waste pipeline 170 so that the negative pressure is relatively unstable, which affects the cutting stability. In addition to the manual transfer, another method to be adopted is to use a carrying driving vehicle 190 to automatically transfer the waste collecting box 150, which is beneficial to realize the intelligent control of waste.

The above are only embodiments of the present application, but the protection scope of the present application is not limited thereto. Any person skilled in the art within the technical field disclosed by the present application can easily think of changes or substitutions, all of which should be included within the protection scope of the present application. Therefore, the protection scope of the present application should be based on the protection scope of the claims.

What is claimed is:

1. A waste collecting device, comprising a frame, a waste buffer box, a negative pressure flow-equalizing box a waste collecting box, and a waste compressing box disposed between the waste buffer box and the waste collecting box, wherein the waste buffer box is arranged on an upper part of the frame, the waste buffer box is provided thereon with a waste pipeline, the waste pipeline is configured to extend to an operation station to make generated waste transported to the waste buffer box, the negative pressure flow-equalizing box is arranged on a top of the waste buffer box, the negative pressure flow-equalizing box is communicated with the waste buffer box, the negative pressure flow-equalizing box is configured to equalize gas flowing in from the waste buffer box, and a negative pressure pipeline is arranged on the negative pressure flow-equalizing box, the negative pressure pipeline is configured to draw out gas in the negative pressure flow-equalizing box, and the waste collecting box is movably arranged at a lower part of the frame and is selectively communicated with the waste buffer box for collecting waste dropped from the waste buffer box.

2. The waste collecting device according to claim 1, wherein a first flow-equalizing plate is further provided between the negative pressure flow-equalizing box and the waste buffer box, the first flow-equalizing plate is provided with a plurality of first flow-equalizing holes, and the negative pressure flow-equalizing box communicates with the waste buffer box through the plurality of first flow-equalizing holes.

3. The waste collecting device according to claim 1, wherein the waste compressing box is selectively communicated with the waste buffer box, the waste compressing box is selectively communicated with the waste collecting box, and the waste compressing box is configured to temporarily store the waste dropped from the waste buffer box and compress the waste.

4. The waste collecting device according to claim 3, wherein a buffer opening is provided at a bottom of the waste buffer box, the buffer opening communicates with the waste compressing box, a waste buffer division plate is movably provided at the buffer opening, and the waste buffer division plate is configured to block or open the buffer opening.

5. The waste collecting device according to claim 3, wherein a compressing opening is provided at a bottom of the waste compressing box, the compressing opening communicates with the waste collecting box, a waste compression division plate is movably provided at the compressing opening, and the waste compression division plate is configured to block or open the compressing opening.

6. The waste collecting device according to claim 3, wherein a compression cylinder is arranged on a top of the waste compressing box, a pressure head is movably arranged in the waste compressing box, and the pressure head is in transmission connection with the compression cylinder so as to compress waste in the waste compressing box under driving of the compression cylinder.

7. The waste collecting device according to claim 3, wherein a negative pressure branch pipeline is further provided on the negative pressure pipeline, and the negative pressure branch pipeline communicates with the waste compressing box.

8. The waste collecting device according to claim 7, wherein a compression flow-equalizing box is further arranged on the waste compressing box, a second flow-equalizing plate is arranged between the compression flow-equalizing box and the waste compressing box, a plurality of second flow-equalizing holes are provided on the second flow-equalizing plate, and the compression flow-equalizing box communicates with the waste compressing box through the plurality of second flow-equalizing holes.

9. The waste collecting device according to claim 3, wherein a bottom of the waste collecting box is further provided with a carrying driving vehicle, and the carrying driving vehicle is configured to drive the waste collecting box to disengage from the frame.

10. The waste collecting device according to claim 9, wherein a housing is further provided on the frame, the housing wraps the waste buffer box, the negative pressure flow-equalizing box and the waste compressing box, and the housing is provided with a discharging opening allowing for the waste collecting box and the carrying driving vehicle to enter and exit.

* * * * *